United States Patent
Kobata et al.

(10) Patent No.: US 6,845,308 B2
(45) Date of Patent: Jan. 18, 2005

(54) ON-VEHICLE AUDIO VIDEO CONTROL DEVICE

(75) Inventors: Keiichi Kobata, Tokyo (JP); Wataru Tanaka, Kanagawa (JP); Toshiyuki Yasuhara, Tochigi (JP)

(73) Assignees: Matsushita Electric Industrial Co., Ltd., Osaka (JP); Honda Giken Kogyo Kabushiki Kaisha, Tokyo (JP)

( * ) Notice: Subject to any disclaimer, the term of this patent is extended or adjusted under 35 U.S.C. 154(b) by 99 days.

(21) Appl. No.: 10/244,203

(22) Filed: Sep. 16, 2002

(65) Prior Publication Data

US 2003/0060954 A1 Mar. 27, 2003

(30) Foreign Application Priority Data

Sep. 18, 2001 (JP) ..................................... P2001-283760

(51) Int. Cl.[7] .............................................. G06F 19/00
(52) U.S. Cl. .......................... 701/36; 381/86; 307/10.1
(58) Field of Search ........................ 701/1, 36; 381/86; 307/9.1, 10.1

(56) References Cited

U.S. PATENT DOCUMENTS

| | | |
|---|---|---|
| 5,661,811 A | 8/1997 | Huemann et al. |
| 6,148,253 A * | 11/2000 | Taguchi et al. ................ 701/48 |
| 6,407,733 B1 * | 6/2002 | Kawakami ................... 345/204 |
| 6,694,236 B2 * | 2/2004 | Onodera ....................... 701/36 |
| 2003/0012389 A1 * | 1/2003 | Brice et al. .................... 381/86 |
| 2003/0053638 A1 * | 3/2003 | Yasuhara ...................... 381/86 |
| 2003/0215102 A1 * | 11/2003 | Marlowe ....................... 381/77 |

OTHER PUBLICATIONS

Shimizu, Shinichi: "On–Vehicle Audio Visual Reproducing Device." Patent Abstracts of Japan, Publication No.: 2001–114027, Date of Pub. Apr. 24, 2002.

Feb. 1995, Seiten 53–62, XP000526407, ISSN: 1042–0967.

* cited by examiner

*Primary Examiner*—Gary Chin
(74) *Attorney, Agent, or Firm*—Pearne & Gordon LLP

(57) ABSTRACT

An on-vehicle audio video control device is provided, which selects a plurality of audio video equipments with a front controller and a real controller, allowing it to select a same source or respective different sources at a front seat and a rear seat. Herein, if an AM/FM switch is selected with a CD changer by the front controller after the rear controller switches to FM1, it is determined whether the rear controller is in radio mode or not. If the rear controller is in radio mode, the front controller is switched to FM1, following FM1 mode on the rear side.

10 Claims, 4 Drawing Sheets

ON-VEHICLE AUDIO VIDEO CONTROL DEVICE

BACKGROUND OF THE INVENTION

1. Field of the Invention

The present invention relates to an on-vehicle audio video control device for controlling, in a car, audio equipment, video equipment, and the like, and particularly relates to an on-vehicle audio video control device that enables audio and video playback etc. also individually at the rear seat in a car.

2. Description of the Prior Art

Conventionally, a system is known that allows playback, at the front or rear seat, from a variety of sources—including audio and video equipment installed in the cabin. Selection of the source is performed with front and rear controllers provided, respectively, in the front and rear parts of the cabin.

However, in the conventional arrangement described above, the last accessed mode (e.g. FM) of a source (e.g. radio tuner) is stored in a 'last memory'. When the source is switched to a source other than the radio tuner (e.g. a CD source) and back to the radio tuner again, the mode of the radio tuner selected is changed to that stored in the 'last memory' in respect of the radio tuner. A problem arises when, for instance, a single radio tuner is used as a source. Even in the event that AM is repeatedly selected by the front controller, the mode will nevertheless change to FM upon the rear controller's selection of the radio, should FM be stored in the 'last memory' by the rear controller. This problem disturbs listening from the front seat.

SUMMARY OF THE INVENTION

An on-vehicle audio video control device according to the invention is provided with a plurality of sources, a front controller for selecting one of the plurality of sources in a front part of a cabin, a rear controller for selecting one of the plurality of sources in a rear part of the cabin, and means for storing the mode, which has been adopted just before the source is switched, into storage means when a source is switched by the front controller or the rear controller and for restarting an operation from the mode stored in the storage means when the source, which has been adopted just before the switching, is selected again. In this constitution, at least one of the above stated sources is a mode selectable source that allows selecting a mode from a plurality of modes, and in a state such that one of the plurality of modes of the mode selectable source is selected by the front controller or the rear controller, when the mode selectable source is selected by the rear controller or the front controller, the rear controller or the front controller is controlled to select the mode that is previously selected by the front controller or the rear controller, whatever the mode stored in the storage means is.

With this configuration, when a mode selectable source is selected by the front or rear controller, the source is changed to another source thereafter, and the mode selectable source is selected again by the front or rear controller, the mode of the front or rear controller will be controlled to follow the mode previously selected by the rear or front controller, whatever the mode stored in the storage means is.

Furthermore, an on-vehicle audio video control device according to the invention is provided with a plurality of sources, a front controller for selecting one of the plurality of sources in a front part of a cabin, a rear controller for selecting one of the plurality of sources in a rear side of the cabin, and means for storing the mode, which has been adopted just before turning off the power supply, into storage means when the power supply of the front or real controller is turned off, and for restarting operation from the mode stored in the storage means when power supply is turned on. In this constitution, at least one of the above stated sources is a mode selectable source that allows selecting a mode from a plurality of modes, and in a state such that one of the plurality of modes of the mode selectable source is selected by the front controller or the rear controller, when power is supplied to the rear controller or the front controller again, the rear controller or the front controller is controlled to select the mode that is previously selected by the front controller or the rear controller, whatever the mode stored in the storage means is.

With this configuration, when a mode selectable source is selected by the front or rear controller, power supply is turned off thereafter, and power is supplied to the front or rear controller again, the mode of the front or rear controller is controlled to follow the mode previously selected by the rear or front controller, whatever the mode stored in the storage means is.

Still furthermore, an on-vehicle audio video control device according to the invention is provided with a plurality of sources, a front controller for selecting one of the plurality of sources in a front part of a cabin, a rear controller for selecting one of the plurality of sources in a rear part of the cabin, and means for storing the mode, which has been adopted just before the source is switched, into storage means when a source is switched by the front controller or the rear controller, and for restarting operation from the mode stored in the storage means when the source, which has been adopted just before the switching, is selected again. In this constitution, at least one of the above stated sources is a mode selectable source that allows selecting a mode from a plurality of modes, and in a state such that one of the plurality of modes of the mode selectable source is selected by the front controller or the rear controller, if the playback operation of the source selected by the rear controller or the front controller is stopped, the rear controller or the front controller is controlled to select the mode that is previously selected by the front controller or the rear controller, whatever the mode stored in the storage means is.

With this configuration, in a state such that one of the plurality of modes of the mode selectable source is selected by the front or rear controller, if the playback operation of the source selected by the rear or front controller is stopped, the rear or front controller is controlled to select the mode previously selected by the front or rear controller, whatever the mode stored in the storage means is.

As described above, the on-vehicle audio vide control device according to the invention has the advantage that the mode of the source currently selected by the front or rear controller cannot be changed by a source switching operation or a mode switching operation in accordance with the last memory of the rear or front controller.

Consequently, an object of the invention is to provide an on-vehicle audio video control device in which the currently used mode does not follow another mode stored in the last memory and cannot be changed upon an operation by the front or rear controller.

The object and the advantages of the invention will be more apparent by the following embodiments with descriptions with reference to the drawings.

DESCRIPTION OF THE PREFERRED EMBODIMENTS

Figure 1:
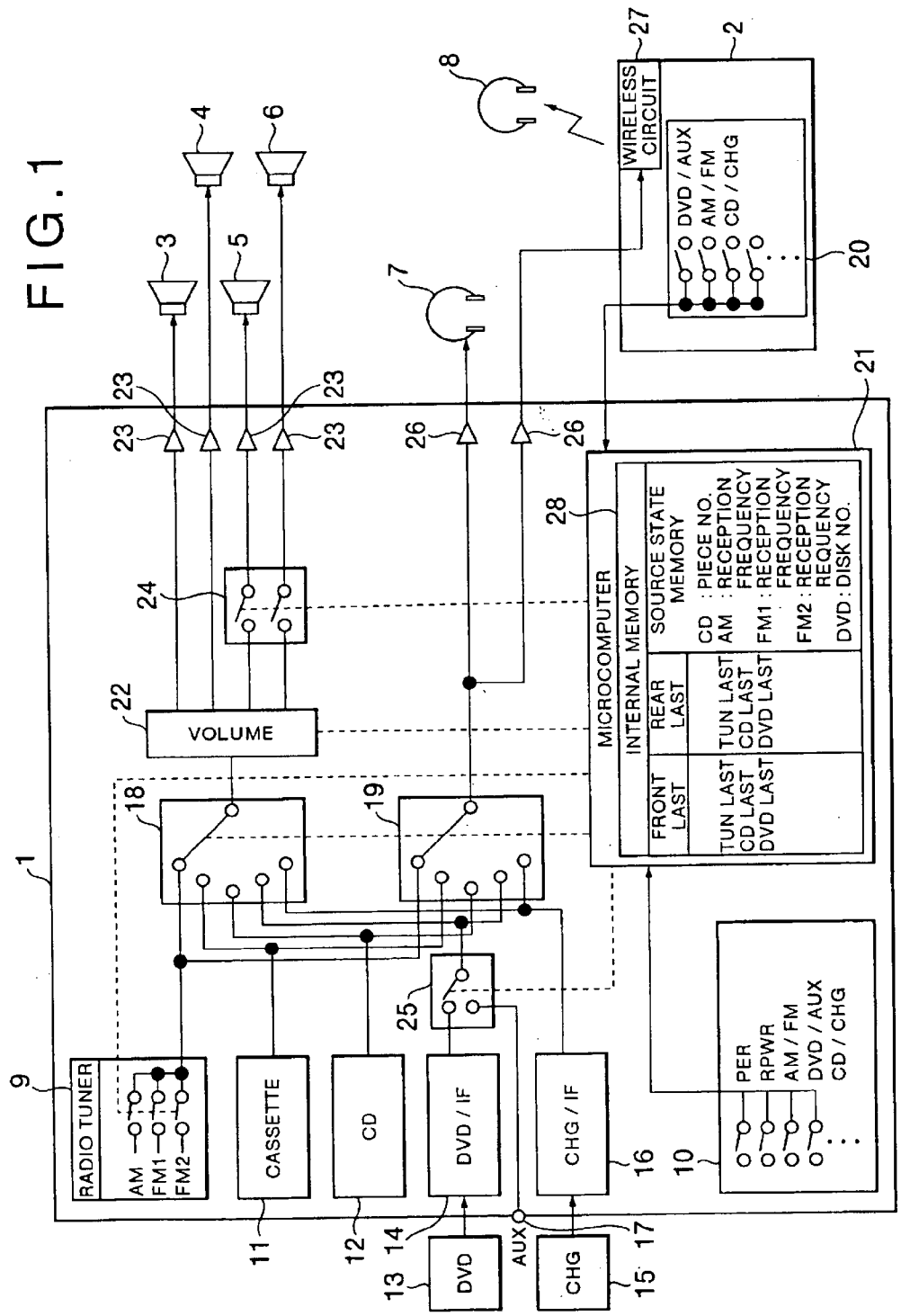
FIG. 1 is a block diagram of an audio video control device in a first embodiment according to the invention.

Preferred embodiments of the invention will be described below and with reference to the drawings. FIG. 1 is a schematic view illustrating an on-vehicle audio-video control device according to a first embodiment of the invention. As shown in FIG. 1, a front controller 1 is provided in the front part of a cabin, e.g., a front controller mounted on an instrument panel. A rear controller 2 is provided in the rear part of the cabin, e.g., a rear controller mounted on the ceiling at a place between the front and rear seats. FIG. 1 also illustrates front speakers 3 and 4 provided in the front left and front right parts of the cabin respectively, rear speakers 5 and 6 provided in the rear left and rear right parts of the cabin respectively, and headphones 7 and 8 to be used at the rear seat. Here the headphone 8 receives audio signals, transmitted wirelessly from the rear controller 2, for reproduction. A radio tuner 9 is built into the front controller 1, wherein the radio tuner 9 can select AM, FM1, and FM2 by key operation of a keyed input portion 10.

The device also includes a cassette player 11, a CD (compact disk) player 12, a DVD player 13, a DVD interface circuit 14, a CD changer 15, and an interface circuit 16 for the CD changer 15. There is also provided an external input terminal 17 which allows connection for a game machine, etc. First and second switching circuits 18 and 19 individually select sources such as the radio tuner 9, the cassette player 11, and the CD player 12. Keyed input portions 10 and 20 are mounted on the front controller 1, and the rear controller 2, respectively. When a source selection key (not shown) of the keyed input portion 10 or 20 is operated, a switching signal is applied to the first 18 or second 19 switching circuit by a microcomputer 21. This switches the source (the radio tuner 9, cassette player 11, CD player 12, DVD player 13, CD changer 15, etc.) according to the switching signal.

The key labeled 'PWR', of the keyed input portion 10 for the front controller 1, is a power supply switch for the front controller 1. The key labeled 'RPWR' is a power supply switch for the rear controller 2. The key labeled 'AM/FM' is a selection switch for selecting the radio tuner 9. The key labeled 'DVD/AUX' is a selection switch for selecting the DVD player, or a unit connected to the external input terminal 17. Furthermore, additional selection switches, such as a cassette player selection switch, a CD player selection switch, and so on, are provided. A volume circuit 22 is controlled by a control signal that is output according to the result of a determination, by the microcomputer 21, of operation of the up/down switch for controlling sound volume. The up/down switches are provided on the keyed input portions 10 and 20 of the front controller 1, and the rear controller 2, respectively. An amplification circuit 23 amplifies audio signals that are output by the volume circuit 22. A switching circuit 24 controls whether or not to apply audio signals to the rear speakers 5 and 6. A switching circuit 25 selects the DVD player 13, or the unit connected to the external input terminal 17.

The audio signals selected by the second switching circuit 19 are supplied to a headphone 7, and a wireless circuit 27 in the rear controller 2, via an amplification circuit 26. In a memory 28 of the microcomputer 21, the last operational modes of the respective sources selected by the front controller 1, and the rear controller 2, are stored. For example, if the power is turned off while listening to an AM broadcast after having selected AM on the radio tuner 9 by the front controller 1, the operational mode 'AM' is stored not only in the memory FRONT LAST, but also in the memory FRONT TUN LAST. If the power is turned off after having selected the CD player 12 by the front controller 1, 'CD' is stored not only in the memory FRONT LAST, but also in the memory FRONT CD LAST. If the selection is changed (from the status of the radio tuner 9 with AM) to another source, such as, for example, to the CD changer 15, 'AM' is stored in FRONT LAST of the memory 28, and in addition, 'CHG' is stored in the memory CD LAST. Likewise, if the power is turned off in the state of playing back the fifth track by a selection of the CD player 12 on the rear controller 2, 'CD' is stored in memories REAR LAST and CD LAST. Additionally, '5' (track number) is stored into the CD state memory of the memory 28. The data stored in FRONT LAST and REAR LAST are referenced respectively when power to the front controller 1, or rear controller 2, is turned on. Data stored in TUN LAST, CD LAST, and DVD LAST are respectively referred to when the radio tuner, the CD player or the CD changer, or the DVD or externally connected unit are selected.

Next, various operations of the first embodiment will be described. When the power switch 'PWR' of the keyed input portion 10 is operated, power is supplied to the front controller 1. As a result, the front controller 1 becomes operable and a source is selected, according to the data stored in FRONT LAST of the memory 28, to start operation of that source. Alternatively, when a source selection switch of the keyed input portion 10 is operated, the source selection switch which has been operated is determined by the microcomputer 21 so that the first switching circuit 18 is switched according to the result of that determination. For example, when the CD player 12 is selected, the CD player 12 operates. The audio output of the CD player 12 is then applied to the speakers 3 through 6 via the first switching circuit 18, the volume circuit 22, and the amplification circuit 23, so as to reproduce the CD audio signals. Thereafter, if the radio tuner 9 is selected by the appropriate source selection switch of the keyed input portion 10, the radio tuner 9 is selected by the switching circuit 18 to allow listening to broadcasts from AM, FM1, or FM2. Herein, when switching from the CD player 12 to the radio tuner 9, 'CD' is stored as data in FRONT LAST and CD LAST of the memory 28. If the button 'CD/CHG' is operated again, the CD player 12 is selected according to the data 'CD' stored in CD LAST. This starts a CD playback operation of the track according to the number stored in the CD status memory.

When the power switch 'RPWR' (controlling the rear controller 2) is operated on the keyed input portion 10 on the front controller 1, power is supplied to the rear controller 2. As a result the rear controller 2 is made operable. A source is selected according to the data stored in REAR LAST, initiating operation of this selected source. Alternatively, when a source selection switch of the keyed input portion 20 of the rear controller 2 is operated, the selected source—for example, DVD audio—is operated and the reproduction signals are supplied to the headphone 7, and the wireless circuit 27, via the amplification circuit 26. The audio signals transmitted by the wireless circuit 27 are then received by the wireless type headphone 8 for reproduction. By selecting a source by key input on the rear controller 2, either the same source as that selected by the front controller 1, or a different source, can be selected.

The switching circuit 24 can be switched on and off by key operation on the front controller 1. If the source selected by the front controller 1, and the source selected by the rear controller 2 are different, the switching circuit 24 automatically turns off. Accordingly it allows a listener, who is listening to audio signals at the rear seat using the headphone 7 or 8, to listen with the headphone without being bothered by the sound output from the rear speakers 5 and 6 positioned nearby.

In the aforementioned first embodiment, with the radio tuner 9, only a single mode from the three modes of AM, FM1, and FM2 can be selected. Also, only one of the DVD player 13 or the external unit connected to the external input terminal 17, can be selected.

Next, operations will be described for the case where only a single mode with a single source, or only a single source from two sources, can be selected.

In the event of listening to an AM broadcast, where the radio tuner 9 has been selected by operation of the front controller 1, and the CD player 12 has been selected by operation of the rear controller 2, if the CD changer 15 is selected by the front controller 1 and, subsequently, FM1 of the radio tuner 9 is selected by the rear controller 2, operation will be as follows. In the state of having selected AM broadcast from the radio tuner 9 by the front controller 1, if the source is then switched to the CD changer 15, 'AM' is stored into FRONT LAST and TUN LAST of the memory 28. If the CD player 12 is thereafter switched to FM1 of the radio tuner 9 by the rear controller 2, it is permitted to listen to FM1 with the headphones 7 and 8.

Figure 2:
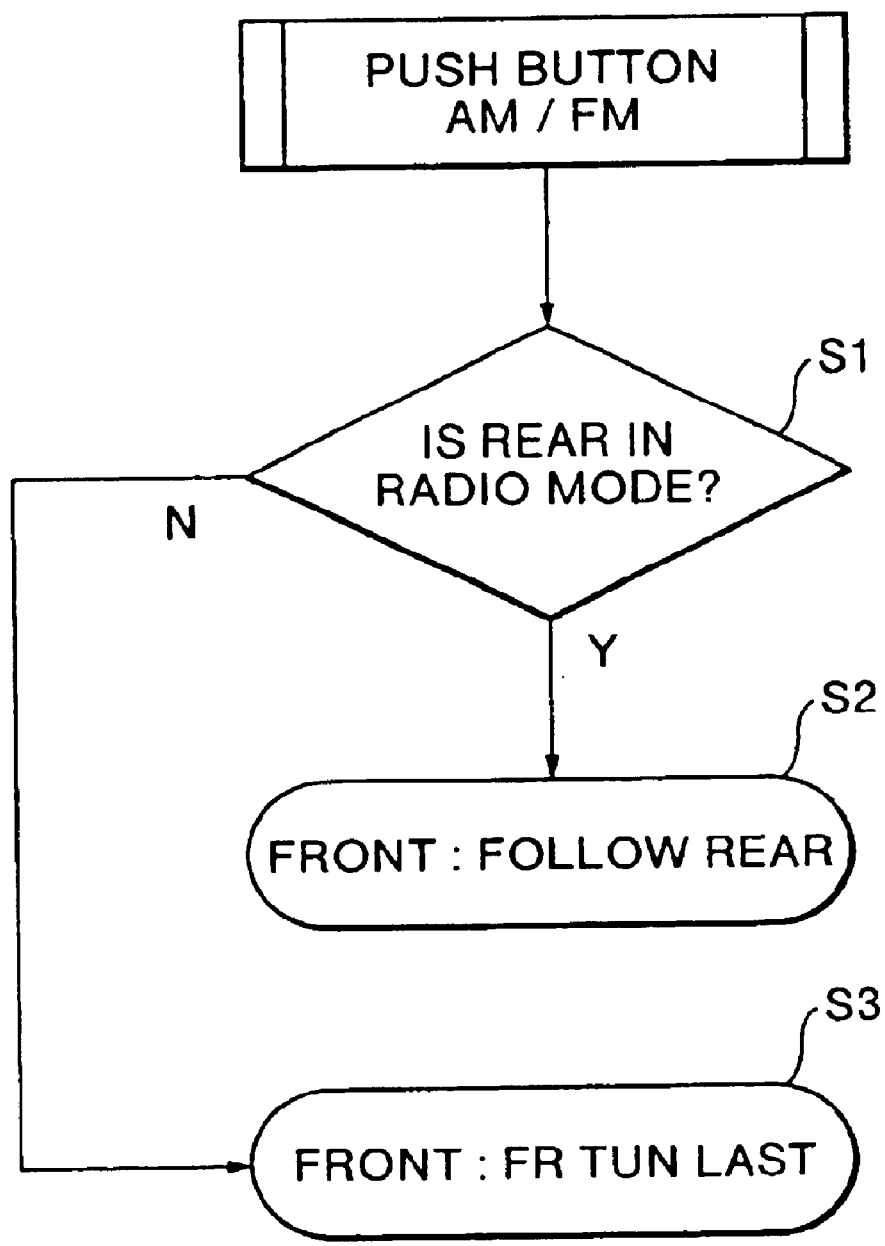
FIG. 2 is an operation flow diagram upon selection of the radio tuner in the first embodiment according to the invention.

After switching from CD player 12 to FM1 by the rear controller 2, if the AM/FM switch is selected while the CD changer 15 is selected on the front controller, it is determined in STEP S1 (as shown in FIG. 2) whether the rear controller 2 is in the radio mode or not. If the rear controller 2 is in the radio mode, it is switched in STEP S2 to FM1 for the front controller 1—following the FM1 mode for the rear half. On the other hand, if it is determined in STEP S1 that the rear half is not in the radio mode, it is then switched in STEP S3 to AM broadcast since AM is stored in TUN LAST of FRONT LAST in the case described above. Thus, in the first embodiment, if the radio tuner 9 is selected by the front half while in the state of the rear half listening to an FM1 broadcast, the front side is switched to FM1, to be the same as the rear half. This is despite the last memory 'AM' being stored for the radio tuner by the front half. Consequently, in the event of the rear half listening to an FM1 broadcast, the mode cannot be forced to switch according to the last memory 'AM' by the front half.

As stated above, in the state of the radio tuner 9 having been selected by the front half (or the rear half), if the source is switched to another source and then switched back to the radio tuner 9, it is checked whether the current selection of the rear half (or front half) is the radio tuner 9 or not at the moment of the source being switched to the radio tuner again by the front half (or rear half). In this checking process, if it is determined that the radio tuner 9 is selected, the front half (or the rear half) follows the rear half (or the front half), regardless of what the data stored in TUN LAST of the front half (or the rear half) is.

Figure 3:
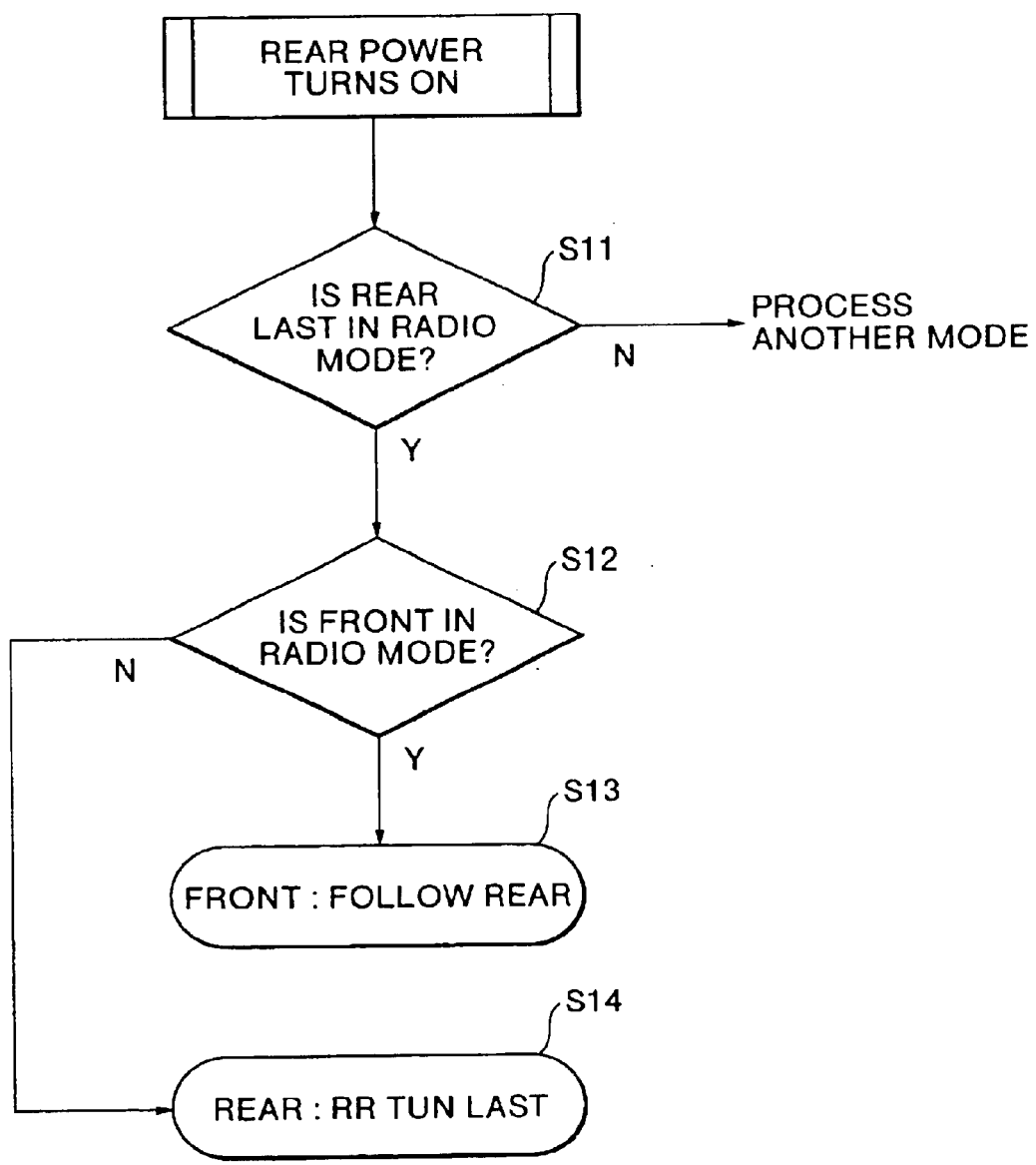
FIG. 3 is an operation flow diagram upon power supply in the first embodiment according to the invention.

Next, in a state where the CD player 12 is selected on the front half, and an AM broadcast selected on the rear half, if the power switch of the rear half is turned off, and it is subsequently switched from the CD player 12 to FM1 on the front half, and the power switch of the rear half is then turned on (as shown in FIG. 3), it is checked in STEP S11 whether REAR LAST of the rear half is the radio mode or not. In this checking process, if it is determined that REAR LAST of the rear half is not the radio mode, another mode set at that time is processed. On the other hand, in the checking process in STEP S11, if it is determined that REAR LAST of the rear half is the radio mode, then it is checked in STEP S12 whether the front half is in the radio mode or not. If it is determined to be in the radio mode, the rear half is, in STEP S13, switched to 'FM1', which is selected on the front half, despite 'AM' being stored in TUN LAST for the rear half. If it is determined in STEP S12 that the front half is not in the radio mode, the rear half is switched in STEP S14 according to the last memory 'AM' for the rear half.

Figure 4:
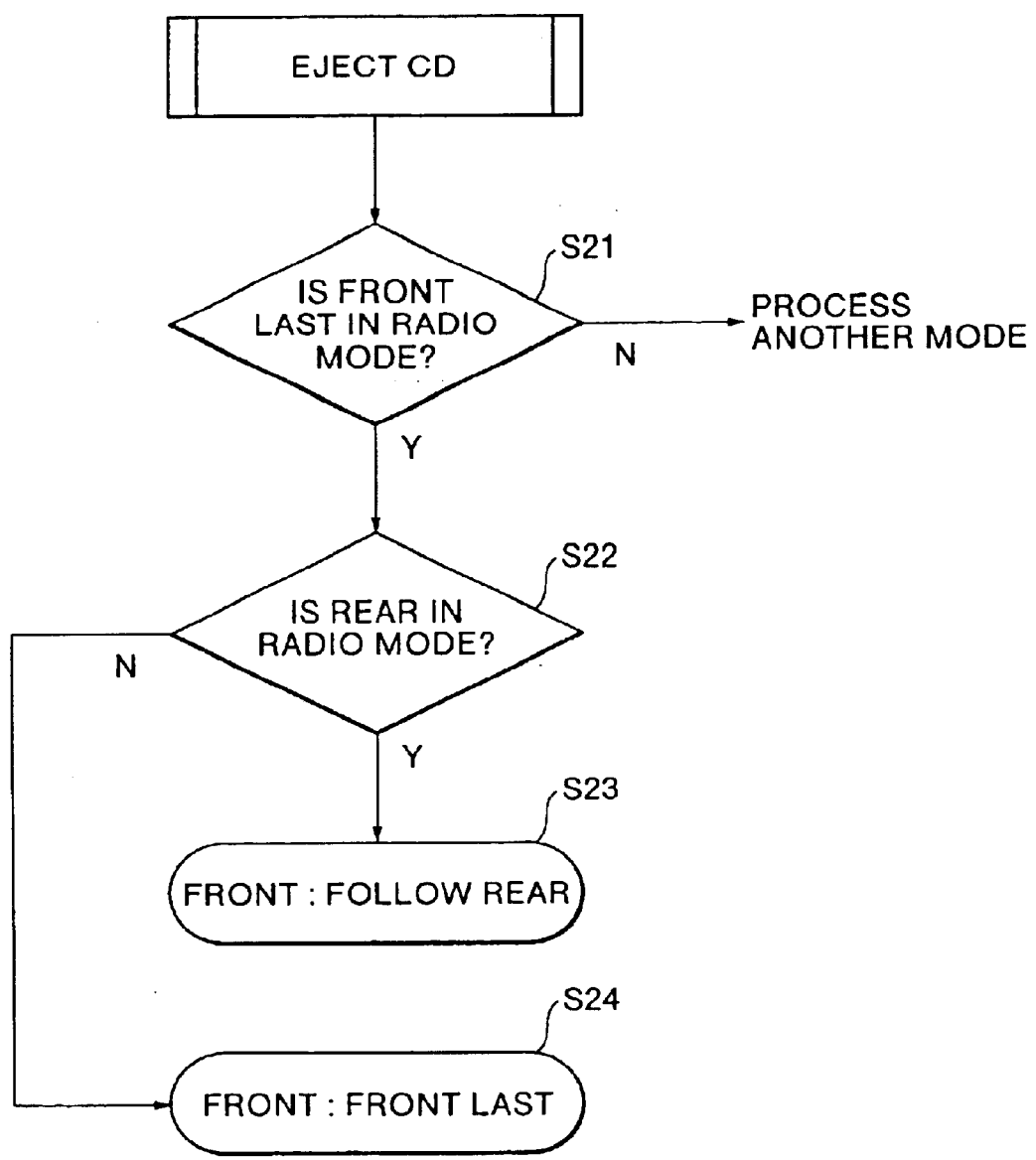
FIG. 4 is an operation flow diagram upon CD ejection in the first embodiment according to the invention.

Next, in the state of having selected AM on the radio tuner 9 by the front half, and having selected the CD player 12 by the rear half, if the source is switched to the CD player 12 by the front half, and subsequently the CD player 12 is switched to FM1 by the rear half, and further following these operations an eject operation is performed to the CD player 12 by the front half, then, as shown in FIG. 4, it is checked in STEP S21 whether FRONT LAST of the front half is in the radio mode or not. In this checking process, if it is determined that FRONT LAST is not the radio mode, another mode set at that time is processed. On the other hand, in the checking process in STEP S21, if it is determined that FRONT LAST is the radio mode, it is then checked in STEP S22 whether the rear half is in the radio mode or not. In this checking process, if the rear half is determined to be in the radio mode, the front half is switched in STEP S23 to 'FM1' (which is selected on the rear side) despite the last memory of 'AM' stored for the front half. If it is determined, in STEP S22, that the rear half is not in the radio mode, the front half is switched to AM, in STEP S24, according to the last memory of 'AM' for the front half.

Although the above description is with regard to the radio tuner 9 having a plurality of modes, the operations are similar to those shown in FIG. 2 through FIG. 4 for the case of selecting the DVD player 13 or an external unit connected to the external input terminal 17.

For example, in a state of having selected the DVD player 13 by operation of the front controller 1, and having selected the CD player 12 by operation of the rear controller 2, if the CD changer 15 is then selected by operation of the front controller 1, and the external unit is then selected by operation of the rear controller 2, the operations will be as follows.

In the state of selecting the DVD player 13 by the front controller 1, if the source is switched to the CD changer 15, then 'DVD' is stored into FRONT LAST and DVD LAST of the memory 28. If the source is thereafter switched from the CD player 12 to the external unit by the rear controller 2, audio signals from the external unit can be reproduced at the headphones 7 and 8. After the source is switched to the external unit by the rear controller 2, if the CD changer 15 is changed to the 'DVD/AUX' switch on the front controller 1, it is checked whether the rear controller 2 is in DVD/AUX mode or not. If it is determined that the rear controller 2 is in DVD/AUX mode, then the front controller 1 is switched to the external unit, following the external unit mode on the rear half. On the other hand, if it is determined that the rear half is not in DVD/AUX mode, the front half is switched to the DVD player 13 because 'DVD' is stored in DVD LAST of the front half, for the case described above.

As stated above, an on-vehicle audio-video control device according to the invention has the advantage that the mode of the source currently selected by the front controller 1 or the rear controller 2 cannot be altered by a source switching operation or a mode switching operation acting purely on information stored in the last memory of the rear controller 2 or the front controller 1.

While the present invention has been described above with reference to the preferred embodiments shown in the drawings, it will be apparent to those skilled in the art that various modifications and changes can be easily made without departing from the spirit or scope of the invention. It is to be understood that such modifications and changes fall within the true scope of the invention.

What is claimed is:

1. An on-vehicle audio video control device, comprising:

a plurality of sources;

a front controller positioned in a front part of a cabin for selecting one of the plurality of sources;

a rear controller positioned in a rear part of a cabin for selecting one of the plurality of sources;

first storage means for storing a source or a mode which has been adopted just before switching, when the source is switched by the front controller;

second storage means for storing a source or a mode which has been adopted just before switching, when the source is switched by the rear controller; and control means for restarting operation from a mode stored in the first storage means or in the second storage means, when the source, which has been adopted before switching, stored in either said first or second storage means is selected again by the front controller or the rear controller, wherein at least one of the plurality of sources is a mode selectable source allowing selection of a mode from a plurality of modes, and in a state such that one of the plurality of modes of the mode selectable source is selected and being operated by either one of the front controller or the rear controller, if the same mode selectable source is selected by either the front or rear controller, the other controller is controlled by the control means so as to select the mode previously selected by either the front or rear controller that corresponds to the mode stored in either the first or second means.

2. The on-vehicle audio video control device according to claim 1, wherein a radio tuner allowing selection of either AM mode or FM mode is used as the mode selectable source.

3. The on-vehicle audio video control device according to claim 1, wherein an equipment group allowing switching among a plurality of audio and video equipments by switching means is used as the mode selectable source.

4. An on-vehicle audio video control device, comprising:

a plurality of sources;

a front controller positioned in a front part of a cabin for selecting one of the plurality of sources;

a rear controller positioned in a rear part of a cabin for selecting one of the plurality of sources;

first storage means for storing a source or a mode which has been adopted just before power is turned off, when power for the front controller is turned off;

second storage means for storing a source or a mode which has been adopted just before power is turned off, when power for the rear controller is turned off; and control means for restarting operation from the mode stored in the first storage means or in the second storage means, when power for the front controller or the rear controller is turned on, wherein at least one of the plurality of sources is a mode selectable source allowing selection of a mode from a plurality of modes, and in a state such that one of the plurality of modes of the mode selectable source is selected and being operated by either one of the front controller or the rear controller, if power for the other controller is turned on after it has been turned off, the other controller is controlled by the control means so as to select the mode previously selected by either the front or rear controller that corresponds to the mode stored in either the first or second storage means.

5. The on-vehicle audio video control device according to claim 4, wherein a radio tuner allowing selection of either AM mode or FM mode is used as the mode selectable source.

6. The on-vehicle audio video control device according to claim 4, wherein an equipment group allowing switching among a plurality of audio and video equipments by switching means is used as the mode selectable source.

7. An on-vehicle audio video control device, comprising:

a plurality of sources; a front controller positioned in a front part of a cabin for selecting one of the plurality of sources;

a rear controller positioned in a rear part of a cabin for selecting one of the plurality of sources;

first storage means for storing a source or a mode which has been adopted just before switching, when the source is switched by the front controller;

second storage means for storing a source or a mode which has been adopted just before switching, when the source is switched by the rear controller; and control means for operation from a mode stored in the first storage means or in the second storage means, when the source, which has been adopted just before switching, stored in the corresponding storage means is selected again by the front controller or the rear controller, wherein at least one of the plurality of sources is a mode selectable source allowing selection of a mode from a plurality of modes, and in a state such that one of the plurality of modes of the mode selectable source is selected and being operated by either one of the front controller or the rear controller, if playback operation of a source selected by either the front or rear controller is stopped, the other controller is controlled by the control means so as to select the mode previously selected by either the front or rear controller that corresponds to the mode stored in either the first or second storage means.

8. The on-vehicle audio video control device according to claim 7, wherein a radio tuner allowing selection of either AM mode or FM mode is used as the mode selectable source.

9. The on-vehicle audio video control device according to claim 7, wherein an equipment group allowing switching among a plurality of audio and video equipments by switching means is used as the mode selectable source.

10. The on-vehicle audio video control device according to claim 7, wherein a source allowing eject operation is used as one of the plurality of sources, and if playback operation of the source is stopped with said eject operation by either the front controller or the rear controller, the controller selects a mode previously selected by the other controller whatever a mode stored in the corresponding storage means of the other controller is.

* * * * *

UNITED STATES PATENT AND TRADEMARK OFFICE
CERTIFICATE OF CORRECTION

PATENT NO. : 6,845,308 B2
DATED : January 18, 2005
INVENTOR(S) : Keiichi Kobata et al.

It is certified that error appears in the above-identified patent and that said Letters Patent is hereby corrected as shown below:

Title page,
Item [56], References Cited, OTHER PUBLICATIONS, please delete "Shimizu, Shinichi:" and insert therefor -- Shimizu Shinichi: --.
Item [57], ABSTRACT,
Line 2, please delete "equipments" and insert therefor -- equipment --.

Column 7,
Line 43, please delete "second means," and insert therefor -- second storage means, --.

Signed and Sealed this

Second Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,845,308 B2
DATED : January 18, 2005
INVENTOR(S) : Keiichi Kobata et al.

It is certified that error appears in the above-identified patent and that said Letters Patent is hereby corrected as shown below:

<u>Title page,</u>
Item [56], References Cited, OTHER PUBLICATIONS, please delete "Shimizu, Shinichi:" and insert therefor -- Shimizu Shinichi: --.
Item [57], ABSTRACT,
Line 2, please delete "equipments" and insert therefor -- equipment --.

<u>Column 7,</u>
Line 43, please delete "second means," and insert therefor -- second storage means, --.

Signed and Sealed this

Eighteenth Day of October, 2005

JON W. DUDAS
*Director of the United States Patent and Trademark Office*